United States Patent Office

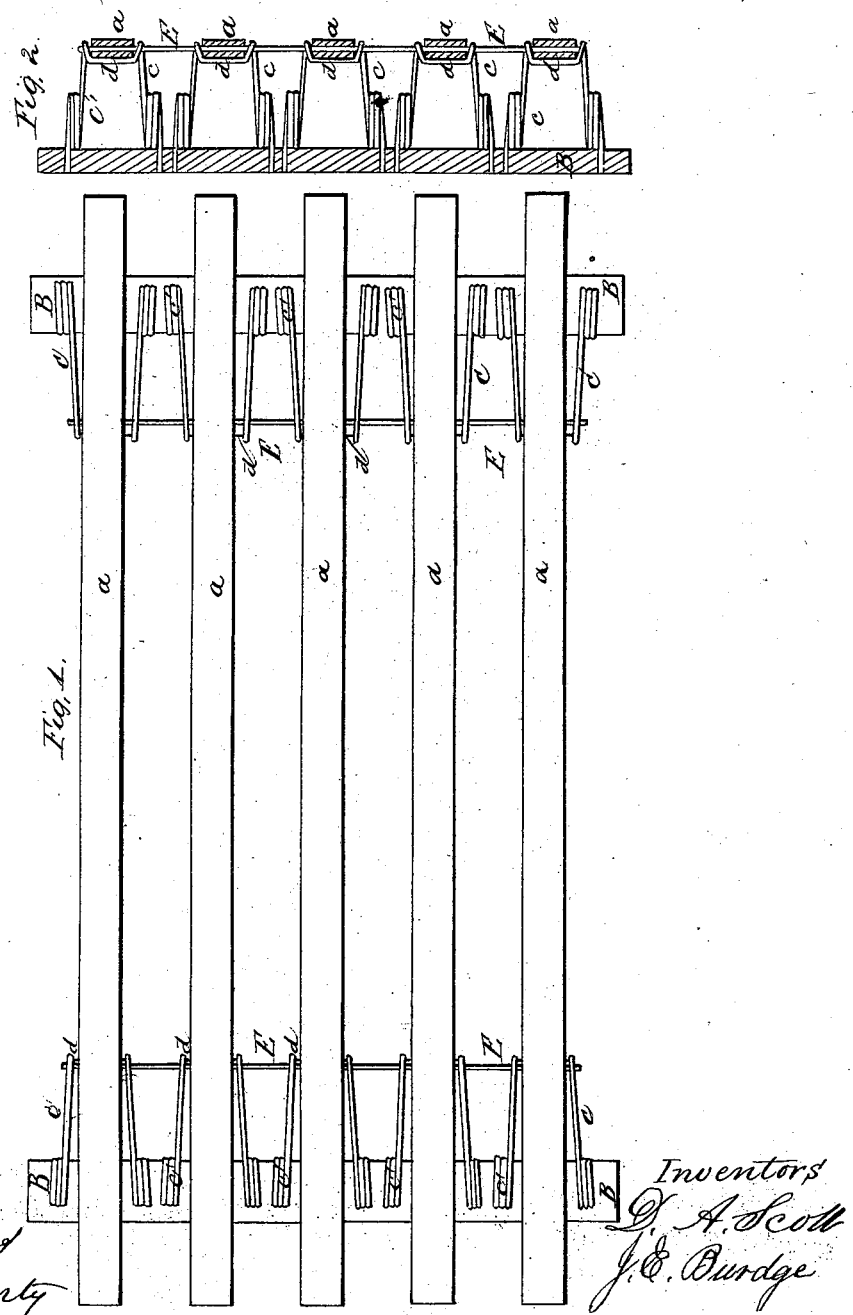

DAVID A. SCOTT AND JONATHAN E. BURDGE, OF CINCINNATI, OHIO.

Letters Patent No. 71,225, dated November 19, 1867.

IMPROVED BED-BOTTOM.

*The Schedule referred to in these Letters Patent and making part of the same.*

---

TO ALL WHOM IT MAY CONCERN:

Be it known that we, DAVID A. SCOTT and JONATHAN E. BURDGE, of Cincinnati, in the county of Hamilton, and State of Ohio, have invented a new and useful invention in Bed-Bottoms; and we do hereby declare that the following is a full, clear, and exact description of the same, reference being had to the annexed drawing, making a part of this specification.

The nature of our invention consists in passing metallic rods transversely through a series of longitudinal slats, in which holes are made just large enough to admit the rods, and so arranging the rods by passing them through the slats and under the arms of a series of springs, alternately, that they hold the slats firmly to their places, and also preventing one from rising above another, whilst they serve, at the same time, to hold and combine the slats and springs together, without the use of cords, nails, or screws, as is the case with all others, more or less, thus saving labor and expense.

Figure 1 is a plan of our improved bed-bottom.

Figure 2 is a transverse sectional elevation of same.

B B represents two transverse bars, in which the springs C' C' are fastened. The longitudinal slats $a\ a$ rest on the inner and upper ends, $d$, of the spring-arms $c\ c$, as shown in fig. 2, and the rods E E pass transversely through the slats, in which holes are made just large enough to admit them, and under the arms $c\ c$ of the springs C', and by this means the slats are firmly held to their places, and also each and every slat is brought to the same plane, and the rods E E fitting closely in the holes in which they pass through in the slats, prevent any lateral motion of the springs and slats, and at the same time prevents the strain from being concentrated on one spring or slat.

We do not claim the springs C' C' nor the longitudinal slats $a\ a$, for these have been used for bed-bottoms before; but what we claim is—

Passing the rods E E transversely through a series of longitudinal slats, $a\ a$, and under the arms $c\ c$ of a like series of springs, for the purpose of securing the slats in their places, substantially and for the purpose set forth.

DAVID A. SCOTT,
JONATHAN E. BURDGE.

Witnesses:
W. R. McCARTY,
WM. G. WILLIAMS.